(12) United States Patent
Nakano et al.

(10) Patent No.: US 10,173,361 B2
(45) Date of Patent: Jan. 8, 2019

(54) VACUUM FORMING METHOD

(71) Applicant: HITACHI CHEMICAL COMPANY, LTD., Chiyoda-ku, Tokyo (JP)

(72) Inventors: Shingo Nakano, Tagawa (JP); Kazunori Hayashi, Tagawa (JP); Shingo Matsubara, Tokyo (JP); Takahiro Maeno, Tokyo (JP); Ryuuta Soutome, Tokyo (JP)

(73) Assignee: HITACHI CHEMICAL COMPANY, LTD., Tokyo (JP)

( * ) Notice: Subject to any disclaimer, the term of this patent is extended or adjusted under 35 U.S.C. 154(b) by 284 days.

(21) Appl. No.: 15/029,132

(22) PCT Filed: Oct. 20, 2014

(86) PCT No.: PCT/JP2014/077867
§ 371 (c)(1),
(2) Date: Apr. 13, 2016

(87) PCT Pub. No.: WO2015/060263
PCT Pub. Date: Apr. 30, 2015

(65) Prior Publication Data
US 2016/0263811 A1    Sep. 15, 2016

(30) Foreign Application Priority Data

Oct. 22, 2013   (JP) .................................. 2013-219122
Oct. 22, 2013   (JP) .................................. 2013-219123

(51) Int. Cl.
*B29L 9/00*        (2006.01)
*B29C 51/10*       (2006.01)
(Continued)

(52) U.S. Cl.
CPC .............. *B29C 51/16* (2013.01); *B29C 51/10* (2013.01); *B29C 51/421* (2013.01); *B29C 51/44* (2013.01); *B29L 2009/00* (2013.01)

(58) Field of Classification Search
CPC ....... B29C 51/10; B29C 51/16; B29C 51/421; B29C 51/44
(Continued)

(56) References Cited

U.S. PATENT DOCUMENTS

2013/0034682 A1*  2/2013  Free ........................ G02B 5/124
                                                     428/68
2013/0220539 A1   8/2013  Takenouchi et al.

FOREIGN PATENT DOCUMENTS

JP        S49-43710       11/1974
JP        H 07186274       7/1995
(Continued)

OTHER PUBLICATIONS

International Search Report issued in International Application No. PCT/JP2014/077867 dated Jan. 6, 2015.
(Continued)

*Primary Examiner* — James D Sells
(74) *Attorney, Agent, or Firm* — Seyfarth Shaw LLP (57) ABSTRACT

A vacuum forming method of forming a decorative film in close contact with a surface of an adherend in a forming space, by using a vacuum forming machine having the forming space seal-formed by a lower box and an upper box, includes: a pressure adjusting process of decompressing a lower division of the forming space sealed to have a lower pressure than an upper division of the forming space so as to produce a pressure difference between the divided forming spaces, thereby setting the pressure in the vicinity of the surface of the adherend lower pressure than that of the periphery thereof; a pressure releasing process of releasing
(Continued)

the pressure difference after the forming process; and an extracting process of extracting a formed product. A lower end portion of the upper box is provided with a jig which suppresses lifting of the decorative film.

5 Claims, 10 Drawing Sheets

(51) Int. Cl.
*B29C 51/16* (2006.01)
*B29C 51/42* (2006.01)
*B29C 51/44* (2006.01)
*B32B 37/00* (2006.01)

(58) Field of Classification Search
USPC ............................................. 156/82
See application file for complete search history.

(56) References Cited

FOREIGN PATENT DOCUMENTS

| JP | H 1052858 | 2/1998 |
|----|-----------|--------|
| JP | 2002079573 | 3/2002 |
| JP | 2007264373 | 10/2007 |
| JP | 2012096403 | 5/2012 |
| JP | 2012116094 | 6/2012 |
| JP | 2013049878 | 3/2013 |
| JP | 2013052424 | 3/2013 |
| WO | WO 2009/004821 | 1/2009 |

OTHER PUBLICATIONS

International Preliminary Report on Patentability issued in International Application No. PCT/JP2014/077867 dated Apr. 26, 2016.
Written Opinion of the International Searching Authority issued in International Application No. PCT/JP2014/077867 dated Jan. 6, 2015.
International Preliminary Report on Patentability issued in International Application No. PCT/JP2014/077868 dated Apr. 26, 2016.
Written Opinion of the International Searching Authority issued in International Application No. PCT/JP2014/077868 dated Jan. 6, 2015.
Non-final Office Action issued in U.S. Appl. No. 15/029,129, dated Sep. 5, 2017.

\* cited by examiner

VACUUM FORMING METHOD

CROSS REFERENCE TO RELATED APPLICATIONS

The present application is a U.S. national stage application under 35 U.S.C. § 371 of PCT International Application No. PCT/JP2014/077867, which was filed on Oct. 20, 2014, which claims priority to Japanese Patent Application No. 2013-219122, which was filed on Oct. 22, 2013, and Japanese Patent Application No. 2013-219123, which was filed on Oct. 22, 2013, the disclosures of each of which are incorporated by reference herein in their entireties.

TECHNICAL FIELD

The present invention relates to a vacuum forming method.

BACKGROUND ART

In a decorating process of an instrument panel, a console box, and the like in the related art, a water transfer printing method using a decorative film, a film insert molding method, or the like is performed. In addition, a vacuum pressure forming method in which there is a little effect of the outside air is also performed (for example, refer to Patent Literatures 1 and 2). In the vacuum pressure forming method, a workpiece to be formed can be heated and formed in a closed off space by using a vacuum forming machine provided with upper and lower chamber boxes.

CITATION LIST

Patent Literature

Patent Literature 1: Japanese Unexamined Patent Publication No. 2002-079573
Patent Literature 2: Japanese Unexamined Patent Publication No. 2012416094

SUMMARY OF INVENTION

Technical Problem

Figure 10:
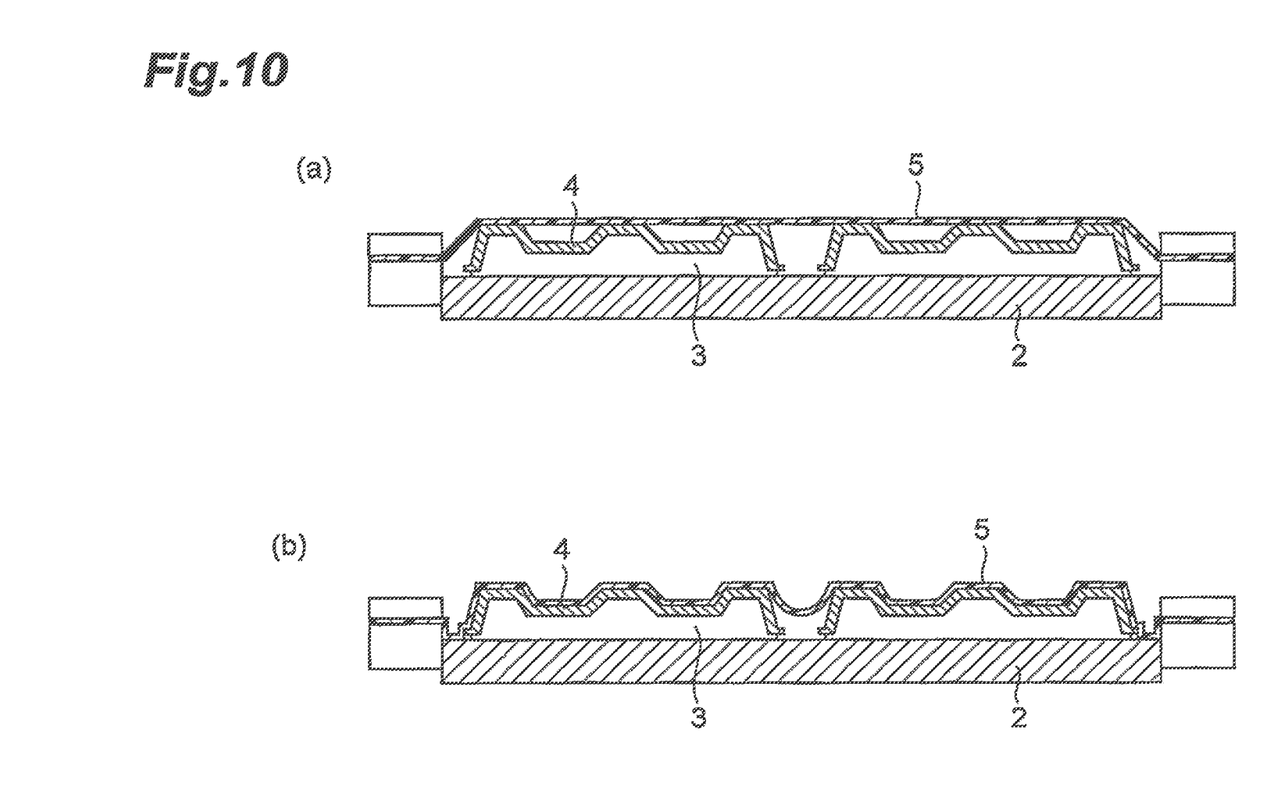
FIG. 10(a) is an explanatory view of a forming process of a vacuum forming method in the related art.
FIG. 10(b) is an explanatory view of a pressure adjusting process.

Regarding the water transfer printing method and the film insert molding method, there are problems in formability, adhesion, scratch resistance, productivity, and the like. In addition, even in the vacuum pressure forming method in the related art in which formability and the like are improved, as illustrated in FIGS. 10(a) and 10(b), lifting of a decorative film occurs, and there is a problem in that product defects caused therefrom are easily generated. In the vacuum pressure forming method in the related art, in the case of deep drawing, there is a slight problem in shape followability, and there is also a problem in external appearance in which parting lines may be seen.

In order to solve the problems, an object of the present invention is to provide a vacuum forming method in which good formability, adhesion, productivity, and the like are provided without lifting of a decorative film.

Solution to Problem

According to an aspect of the present invention, a vacuum forming method of forming a decorative film in close contact with a surface of an adherend in a forming space, by using a vacuum forming machine having the forming space seal-formed by a lower box opening upward and an upper box opening downward, includes: a placing process of placing and accommodating the adherend in an accommodation portion on a movable table provided in the lower box; a sealing process of vertically dividing the forming space by the decorative film as a boundary, and sealing the table and the adherend in a lower division of the forming space; a heating process of heating the decorative film; a forming process of allowing the table on which the adherend is placed in the placing process to approach a lower side of the decorative film heated in the heating process and forming the decorative film in close contact with the surface of the adherend; a pressure adjusting process of decompressing the lower division of the forming space sealed in the sealing process to have a lower pressure than an upper division of the forming space so as to produce a pressure difference between the divided forming spaces, thereby setting the pressure in the vicinity of the surface of the adherend set on the table lower than that of the periphery thereof; a pressure releasing process of releasing the pressure difference produced in the pressure adjusting process after the forming process; and an extracting process of extracting a formed product while releasing the pressure difference in the pressure releasing process, in which a lower end portion of the upper box is provided with a jig which suppresses lifting of the decorative film.

In addition, in the lower and portion of the upper box, the jig may be provided to be positioned on the outside of the periphery of the adherend so as to be defined individually.

In addition, the jig may have a wire shape or a thin plate shape.

In addition, the surface of the adherend may be subjected to a flame treatment.

In addition, in the pressure adjusting process, the lower division of the forming space may be allowed to be in a vacuum state, and the upper division of the forming space may be allowed to be in a pressurized state, a state at atmospheric pressure, or a state at a pressure lower than the atmospheric pressure.

Advantageous Effects of Invention

In the aspect of the present invention, it is possible to provide a vacuum forming method in which good formability, adhesion, productivity, and the like are provided without lifting of a decorative film.

DESCRIPTION OF EMBODIMENTS

Hereinafter, an embodiment of a vacuum forming method according to an aspect of the present invention will be described in detail with reference to the drawings.

In a vacuum forming method according to the embodiment, basically, a decorative film is formed in close contact with the surface of an adherend by using a vacuum forming machine M in which a sealed forming space or an open state is formed by a lower box and an upper box which approach each other or become distant from each other.

The adherend is a resin molding. For example, the adherend is used as an instrument panel, a console box, or the like for a vehicle. The decorative film is a transparent or translucent resin film decorated by printing, coating, vacuum deposition, coloring, or the like. The material of the decorative film is not particularly limited. Specifically, as the material of the decorative film, an acrylic resin, a polyester-based resin, a polyolefin-based resin, a polycarbonate-based resin, a fluororesin, and the like may be employed.

In order to enhance adhesion to the decorative film, it is preferable that an adhesion acceleration treatment such as a primer treatment or a flame treatment is performed on the surface of the adherend. As the adhesion acceleration treatment, a flame treatment, a corona treatment, or an ITRO treatment is preferable, and a frame treatment is particularly preferable.

The vacuum forming method according to the embodiment includes a placing process, a sealing process, a heating process, a forming process, a pressure adjusting process, a pressure releasing process, and an extracting process. Hereinafter, each of the processes will be described.

Figure 1:
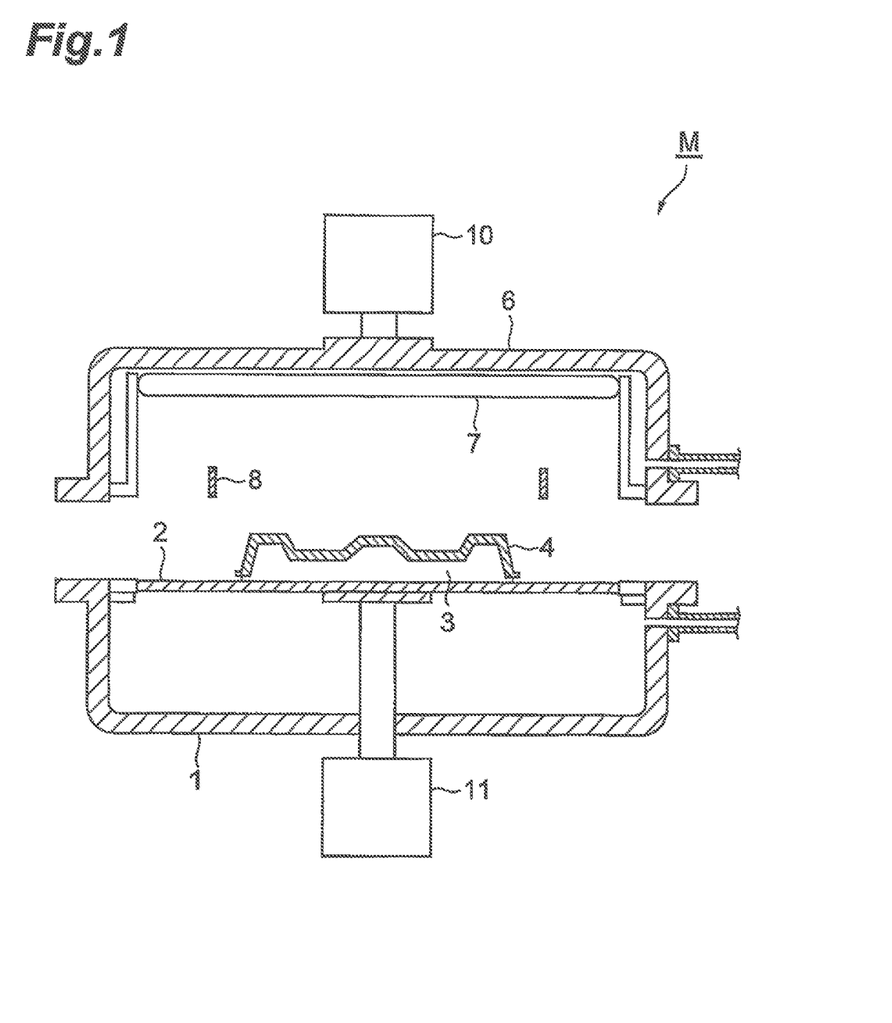
FIG. 1 is an explanatory view of a placing process of a vacuum forming method of an embodiment.

As illustrated in FIG. 1, in the placing process, an adherend 4 is placed and accommodated in an accommodation portion 3 on, a movable table 2 provided in a lower box 1. The accommodation portion 3 which accommodates the adherend 4 beforehand may be moved onto the table 2 and placed thereon. Otherwise, the accommodation portion 3 may be placed on the table 2 and the adherend 4 may be accommodated therein. In the vacuum forming machine M, the lower box 1 is provided with the accommodation portion 3 in which the adherend 4 is placed and accommodated, and the lower end portion of an upper box 6 is provided with a jig 8b which suppresses lifting of a decorative film 5 (see FIG. 2).

Figure 7:
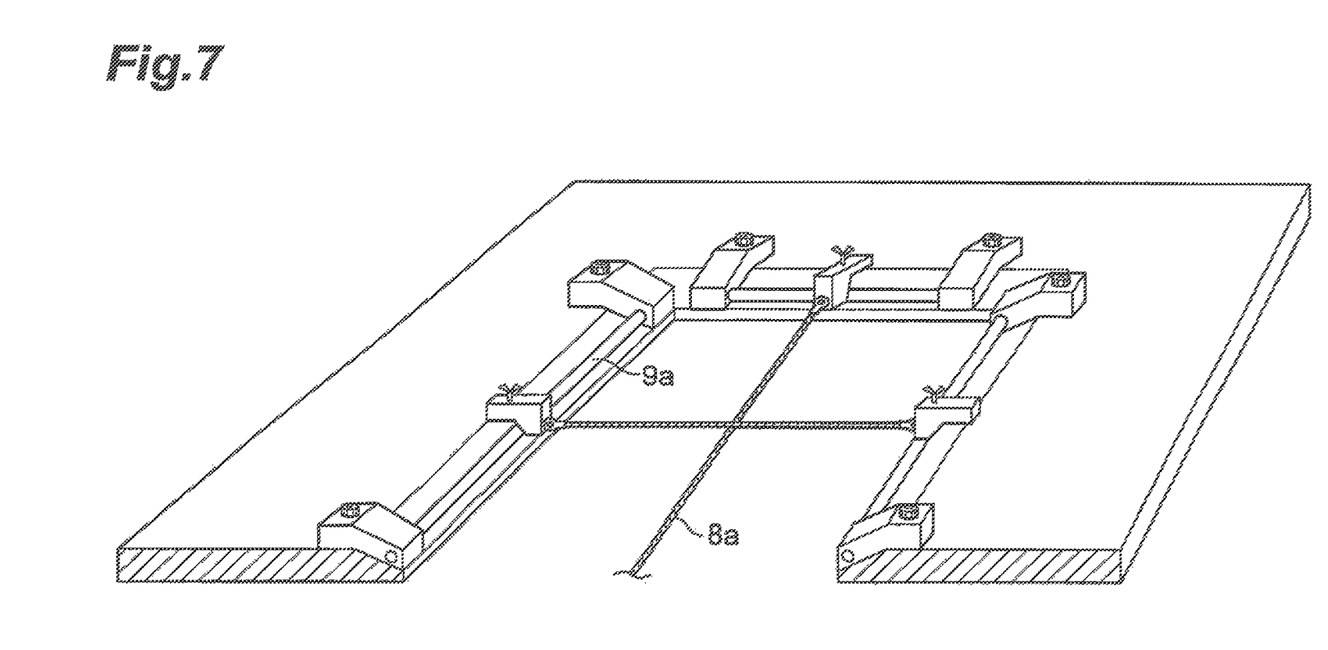
FIG. 7 is a perspective view illustrating a lower end portion of an upper box of a vacuum forming machine used in the vacuum forming method of the embodiment.
Figure 8:
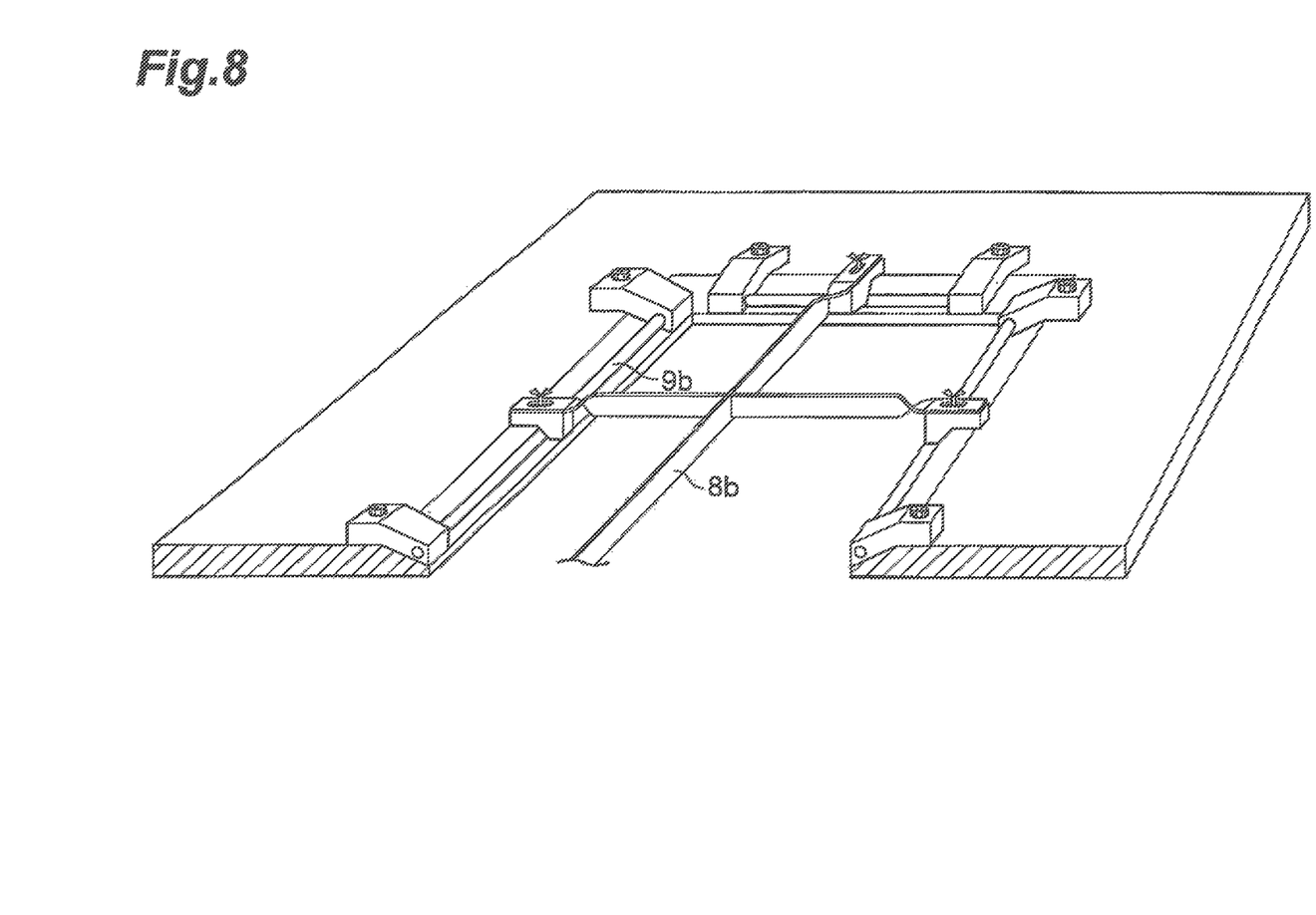
FIG. 8 is a perspective view illustrating a lower end portion of the upper box of the vacuum forming machine used in the vacuum forming machine of the embodiment.

FIGS. 7 and 8 are perspective views illustrating the lower end portion of the upper box of the vacuum forming machine used in the vacuum forming method of this embodiment. As illustrated in FIG. 7, a lower end portion 9a of the upper box 6 is provided with a wire-shaped jig 8a which suppresses lifting of the decorative film 5. Otherwise, as illustrated in FIG. 8, a lower end portion 9b of the upper box 6 is provided with a thin plate-shaped jig 8b which suppresses lifting of the decorative film 5.

As illustrated in FIGS. 7 and 8, in the lower end portions 9a and 9b of the upper box 6, each of the jigs 8a and 8b which suppress lifting of the decorative film 5 is provided so as to be positioned beyond the periphery of the adherend 4 so as to be defined individually. "So as to be defined individually" means that the jig 8 which suppresses lifting of the decorative film 5 is provided between at least two adjacent adherends 4 in a case where a plurality of adherends 4 are placed and accommodated in the accommodation portion 3 on a movable table 2 provided in the lower box 1.

It is preferable that the jig 8 is provided so as to be positioned in the vicinity of the adherend 4 and beyond the periphery of the adherend 4. In a case where the adherend 4 is a quadrilateral, the jig 8 may be in the vicinity of the outside of the periphery of at least one side, preferably two or more sides of the quadrilateral.

The material, shape, and the like of the jig 8 which suppresses lifting of the decorative film 5 are not particularly limited as long as the jig 8 has a function of suppressing lifting of the decorative film 5. It is preferable that the jig 8 has a wire shape or a thin plate shape. In the case of the jig 8a having the wire shape, the diameter thereof is 3 mm to 5 mm, and the material thereof is stainless steel. In the case of the jig 8b having the thin plate shape, the thickness thereof is 3 mm to 5 mm, the width thereof is 20 mm to 50 mm, and the material thereof is aluminum or stainless steel.

Regarding the jig 8a having the wire shape, the wire tension thereof is 50 N to 200 N in order to suppress a reaction force of the decorative film 5. When the wire tension is less than 50 N, there is concern that lifting of the decorative film 5 may occur. In a case where the wire tension is higher than 200 N, the decorative film 5 enters an unnecessarily excessively stretched state, and there is concern that winkles may be generated in the decorative film. Regarding the jig 8a having the wire shape, since the diameter thereof is in a range of 3 mm to 5 mm, the reaction force of the decorative film 5 is suppressed, and lifting of the decorative film 5 does not occur.

As illustrated in FIG. 1, in the vacuum forming machine M of this embodiment, a heater 7 is assembled in the upper box 6. The heater 7 heats the decorative film 5 in a forming space formed by joining the upper box 6 and the lower box 1.

The upper box 6 and the lower box 1 can be joined to each other and be separated from each other. That is, the upper box 6 is provided with a driving device 10 such that the upper box 6 can be lifted and lowered. The table 2 is disposed in the lower box 1, and the table 2 can be lifted and lowered by a driving device 11. As each of the driving devices 10 and 11, for example, an air cylinder, a hydraulic cylinder, a servomotor, and the like can be used. In addition, a vacuum circuit is laid out in the lower box 1. A vacuum circuit and a compressed air circuit are laid out in the upper box 6.

Figure 2:
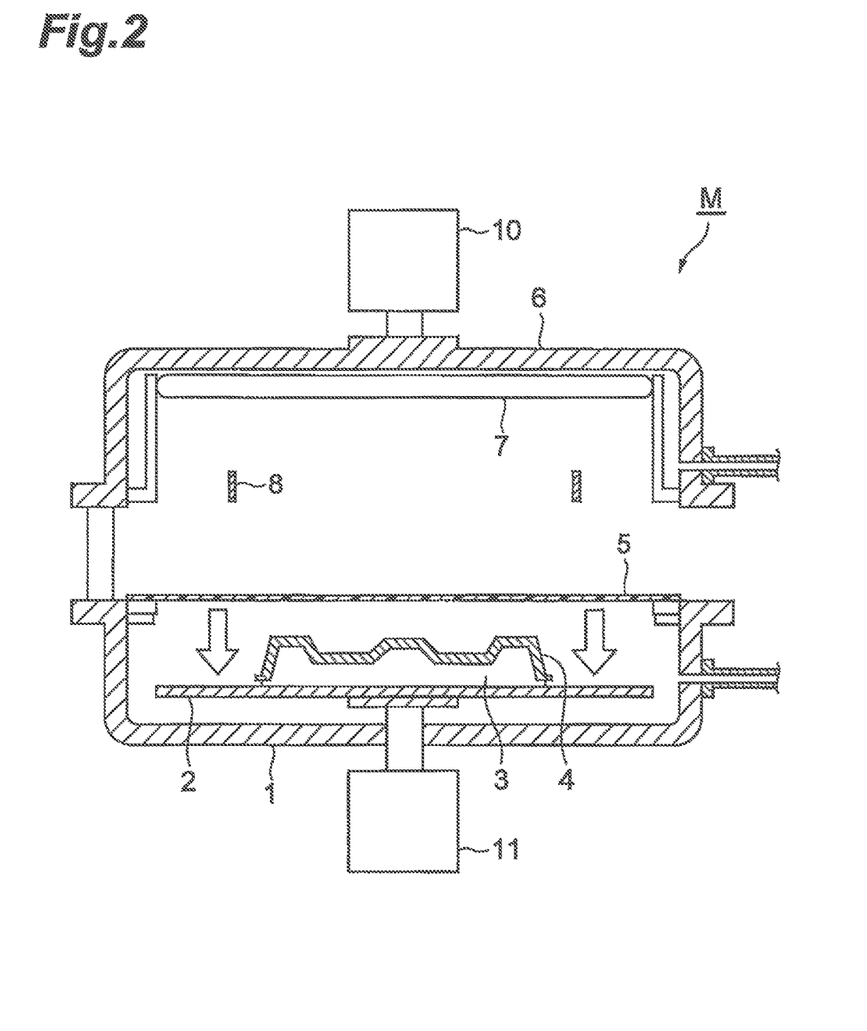
FIG. 2 is an explanatory view of a decorative film placing process of the vacuum forming method of the embodiment.

As illustrated in FIG. 2, in the sealing process, the movable table on which the adherend 4 is placed and accommodated in the accommodation portion 3 is lowered, and thereafter the decorative film 5 is placed on the upper portion of the lower box 1 so as to vertically divide the forming space by the decorative film 5 as the boundary. Accordingly, the forming space is vertically divided by the decorative film 5 as the boundary, and the table 2 and the adherend 4 are sealed in the lower division of the forming space.

Figure 3:
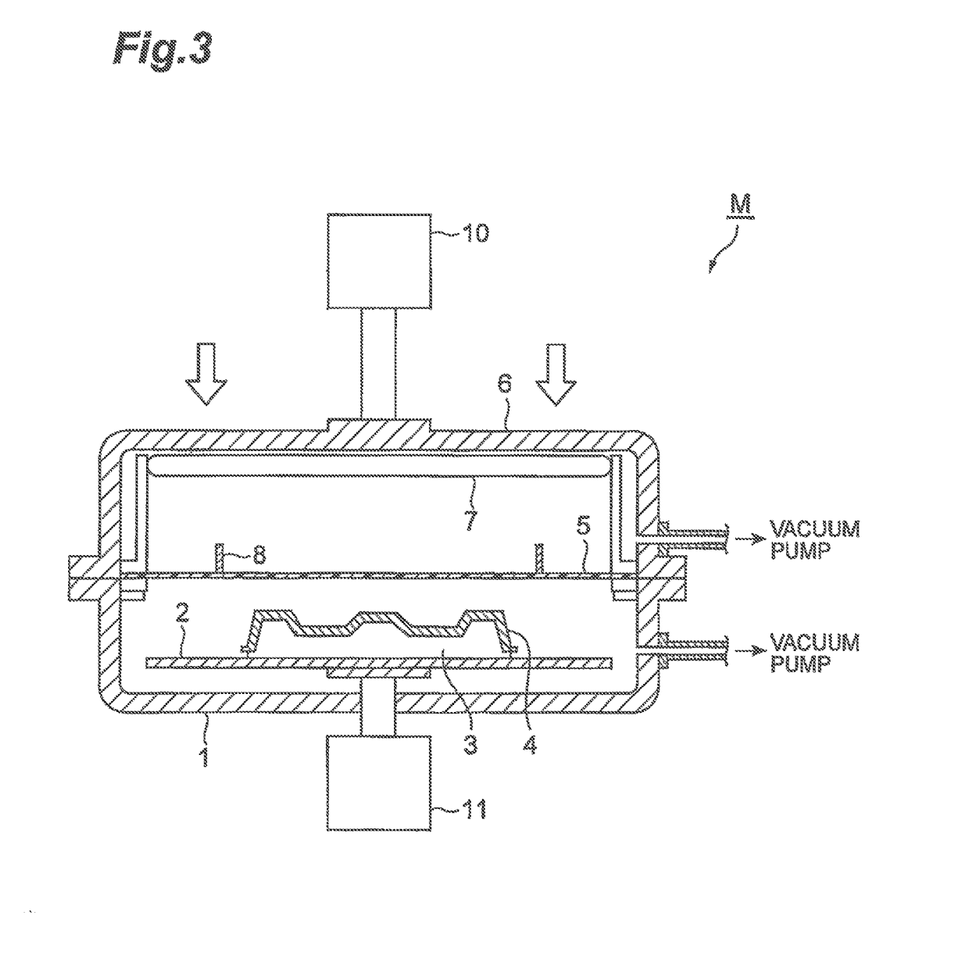
FIG. 3 is an explanatory view of a heating process and a sealing process of the vacuum forming method of the embodiment.

Thereafter, as illustrated in FIG. 3, in the heating process, the decorative film 5 is heated. Here, by lowering the upper box 6 so as to be in close contact with the lower box 1, the table 2 and the adherend 4 are sealed in the lower division of the forming space. Subsequently, the heater 7 is started up to heat the decorative film 5. Furthermore, both of the lower box 1 and the upper box 6 are decompressed to a vacuum state using a vacuum pump (not illustrated) or the like. A sealed state is a state in which the decorative film 5 is placed on the upper portion of the lower box 1 and the lower box 1 and the upper box 6 are in close contact with each other.

Figure 4:
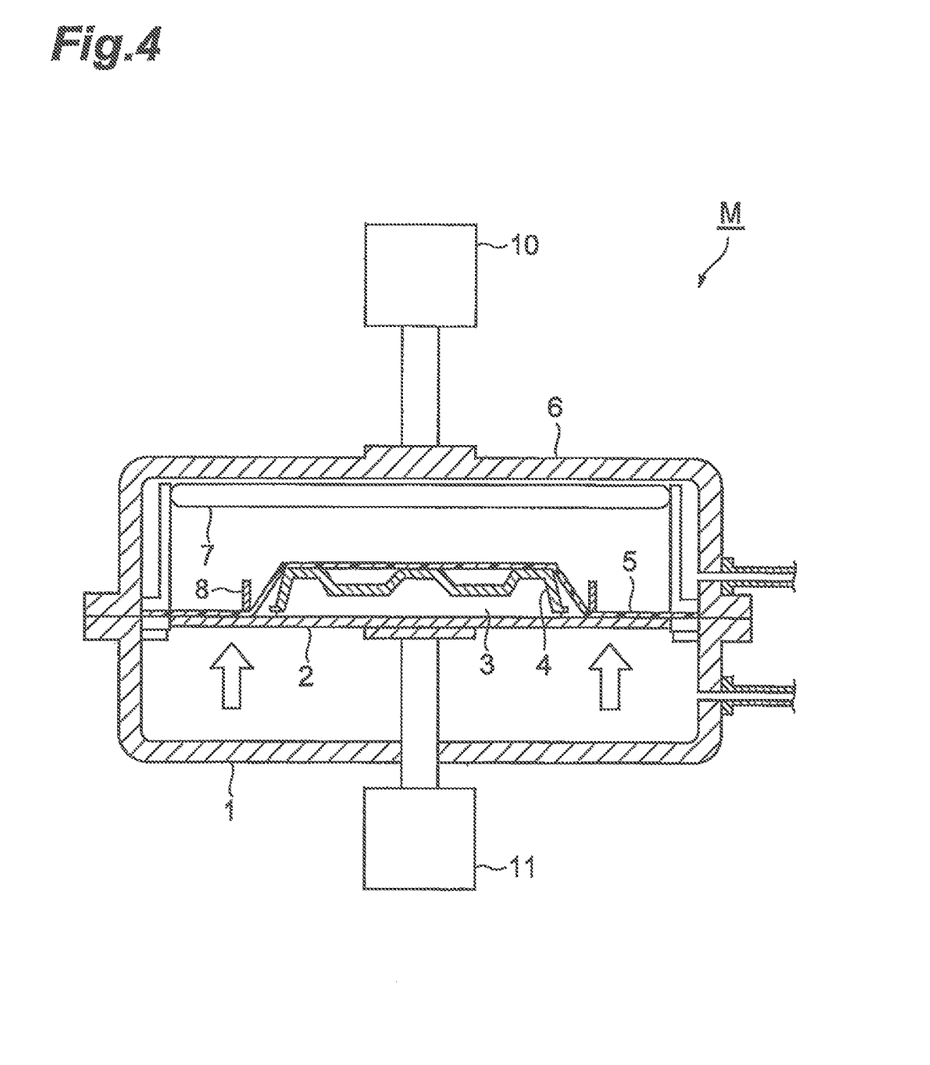
FIG. 4 is an explanatory view of a forming process of the vacuum forming method of the embodiment.

As illustrated in FIG. 4, in the forming process, the table 2 on which the adherend 4 is placed in the placing process is allowed to approach the lower side of the decorative film 5 heated in the heating process and the decorative film 5 is formed in close contact with the surface of the adherend 4. When the temperature of the heated decorative film 5 reaches 100° C. to 150° C., the table 2 on which the adherend 4 is placed is lifted, and the decorative film 5 comes into contact with (covers) a portion of the surface of the adherend 4. At this time, lifting of the decorative film 5 on the outside of the periphery of the adherend 4 is suppressed by the jig 8 provided in the lower end portion of the upper box 6.

Figure 5:
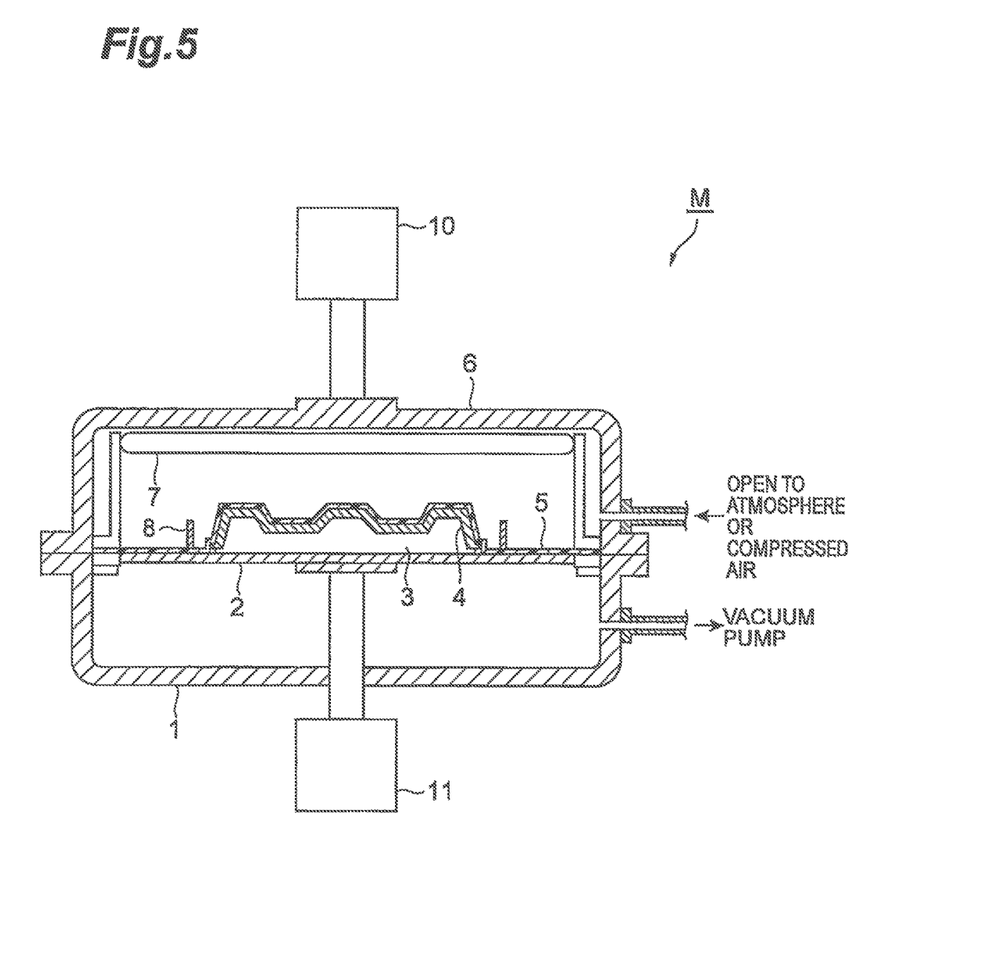
FIG. 5 is an explanatory view of a pressure adjusting process of the vacuum forming method of the embodiment.

As illustrated in FIG. 5, in the pressure adjusting process, the pressure in the lower division of the forming space sealed by the sealing process is reduced compared to that of the upper division of the forming space to produce a pressure difference between the divided forming spaces. Accordingly, the pressure in the vicinity of the surface of the adherend 4 set on the table 2 is lower than that of the periphery thereof. Specifically, as illustrated in FIG. 5, with the table 2 and the decorative film 5 acting as the boundary the lower division of the forming space is maintained in a decompressed state, and the upper division of the forming space is pressurized or is open to the atmosphere to neutralize the decompressed state. At this time, the upper division of the forming space may be in any of a pressurized state or a state at atmospheric pressure. Heating of the decorative film 5 is stopped.

When a pressure difference is produced in the forming space, by stopping the heating of the decorative film 5, the excessively stretched state of the decorative film 5 due to the heating is relieved. Accordingly, the decorative film 5 appropriately follows the shape of the adherend 4, and loosening of the decorative film 5 which is a cause of lifting of the decorative film 5 does not occur.

When the lower division (the lower box 1) of the forming space is decompressed to have a lower pressure than the upper division (the upper box 6) of the forming space and a pressure difference between the divided forming spaces can be produced, the lower division (the lower box 1) of the forming space is maintained in the decompressed state (vacuum state), and the upper division (the upper box) of the forming space is not open to the atmosphere but the decompressed state (vacuum state) is relieved to enter a state at a pressure lower than the atmospheric pressure.

Figure 9:
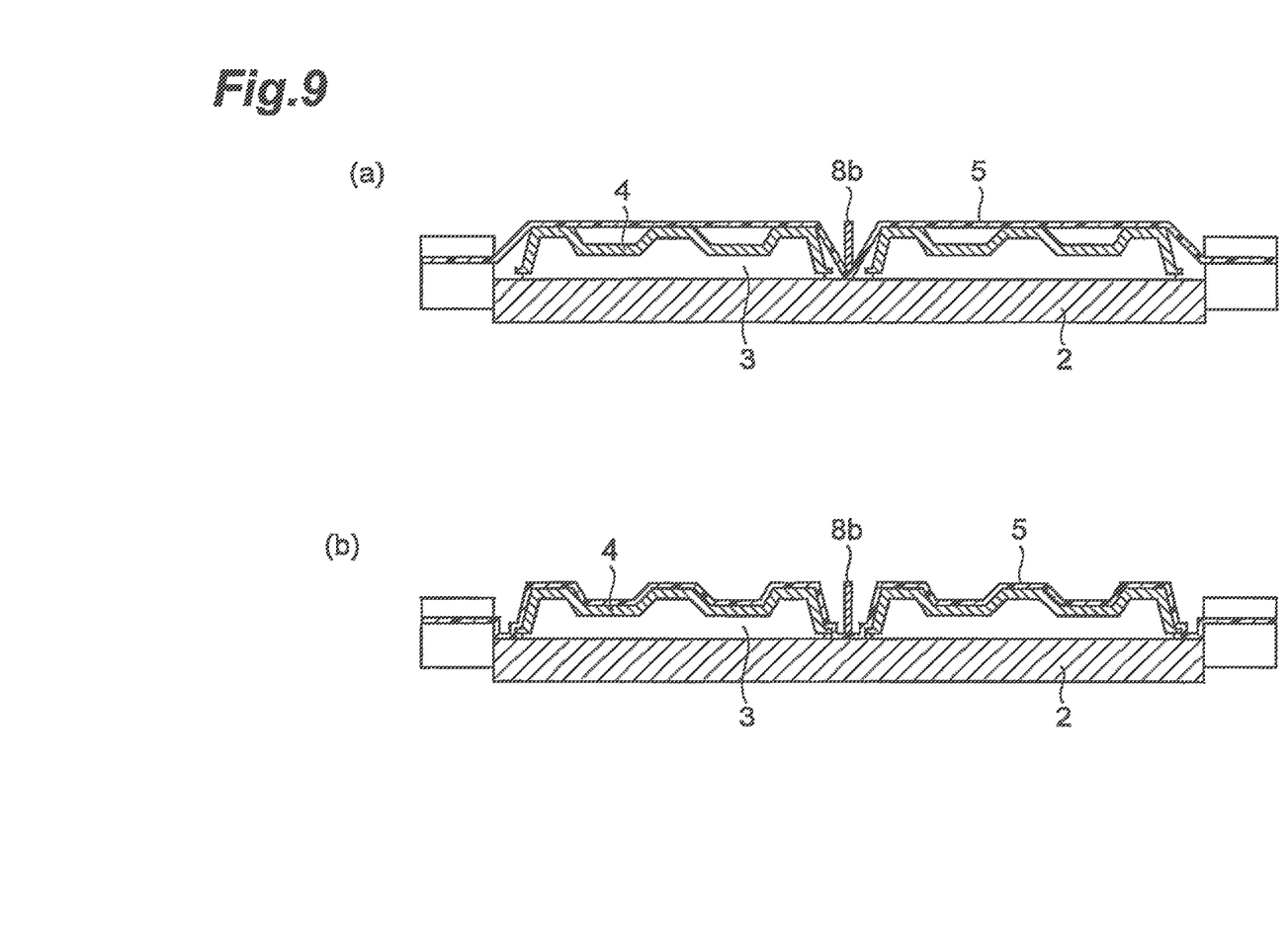
FIG. 9(a) is an explanatory view of the forming process of the vacuum forming method of the embodiment.
FIG. 9(b) is an explanatory view of the pressure adjusting process.

As illustrated in FIGS. 5 and 9(*b*), the decorative film 5 is pressed against the adherend 4 to be overlaid (to be formed) by releasing the vacuum in the upper division of the forming space (the upper box 6). By supplying compressed air into the upper division of the forming space (the upper box 6) from a compressed air tank (not illustrated) (pressurized state), the decorative film 5 can be allowed to come into close contact with the adherend 4 with a greater force.

The pressure in the vicinity of the surface of the adherend 4 set on the table 2 is lower than that of the periphery thereof, and furthermore, as illustrated in FIGS. 4 and 9(*a*), when the table 2 is lifted, lifting of the decorative film 5 on the outside of the periphery of the adherend 4 is suppressed by the jig 8*b* provided in the lower end portion of the upper box 6. Therefore, the decorative film 5 follows the surface of the adherend 4 and reliably comes into close contact therewith.

Particularly, since lifting of the decorative film 5 is suppressed, even in the case of deep drawing, there is no problem in shape followability. In addition, since the edges of the decorative film 5 are reliably wound and parting lines are not seen, external appearance is also enhanced.

In the vacuum forming method of this embodiment, the pressure adjusting process may be performed after the forming process or may be performed simultaneously with the forming process. By simultaneously performing the pressure adjusting process and the forming process, the decorative film 5 is uniformly adhered to the surface of the adherend 4 at a time, which is effective in solving problems (winkles or the like) in external appearance and is thus preferable.

Figure 6:
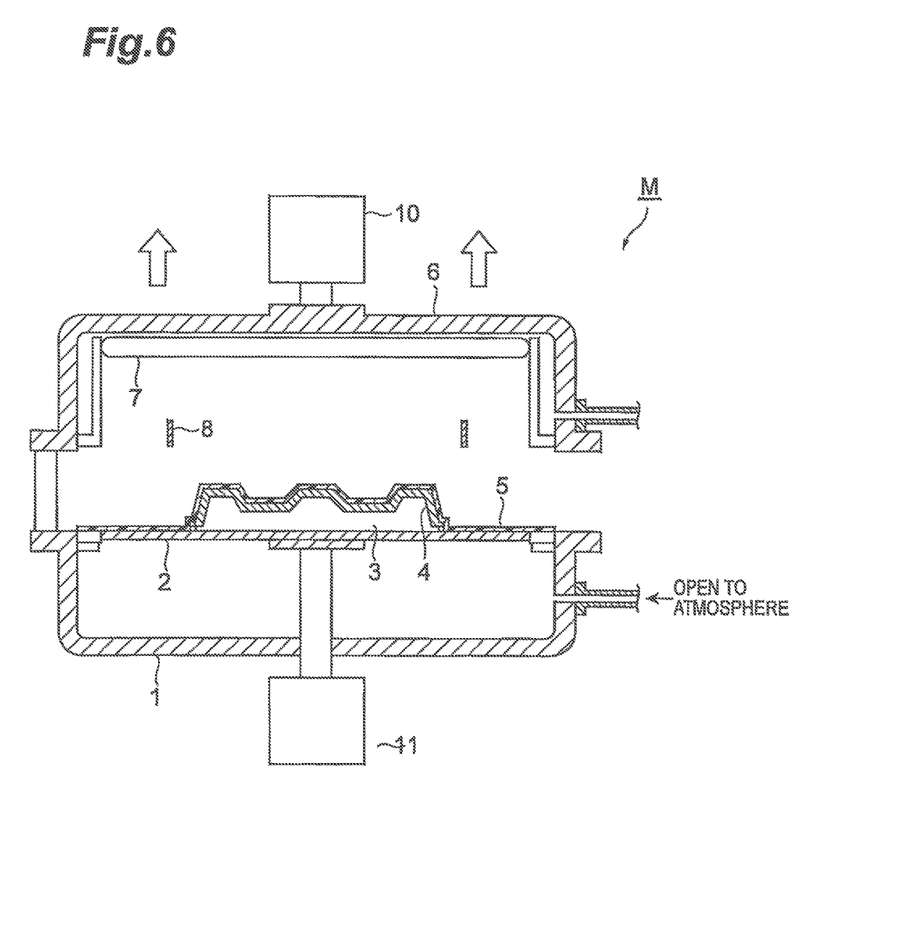
FIG. 6 is an explanatory view of an extracting process of the vacuum forming method of the embodiment.

As illustrated in FIG. 6, in the pressure releasing process, the pressure difference produced in the pressure adjusting process is released. In the extracting process, a formed product is extracted while releasing the pressure. The lower division of the forming space and the upper division of the forming space are open to the atmosphere, thereby releasing the pressure difference. Thereafter, the upper box 6 is lifted, and the adherend 4 having the decorative film 5 (the formed product) is extracted.

REFERENCE SIGNS LIST

1: lower box
2: table
3: accommodation portion
4*e* adherend
5: decorative film
6: upper box
7: beater
8, 8*a*, 8*b*: jig
9*a*, 9*b*: lower end portion of upper box
10, 11: driving device
M: vacuum forming machine

The invention claimed is:

1. A vacuum forming method of forming a decorative film in close contact with a surface of an adherend in a forming space, by using a vacuum forming machine having the forming space seal-formed by a lower box opening upward and an upper box opening downward, the method comprising:

a placing process of placing and accommodating the adherend in an accommodation portion on a movable table provided in the lower box;

a sealing process of vertically dividing the forming space by the decorative film as a boundary, and sealing the table and the adherend in a lower division of the forming space; a heating process of heating the decorative film;

a forming process of allowing the table on which the adherend is placed in the placing process to approach a lower side of the decorative film heated in the heating process and forming the decorative film in close contact with the surface of the adherend;

a pressure adjusting process of decompressing the lower division of the forming space sealed in the sealing process to have a lower pressure than an upper division of the forming space so as to produce a pressure difference between the divisions of the forming space, thereby setting the pressure in the vicinity of the surface of the adherend set on the table lower than that of the periphery thereof;

a pressure releasing process of releasing the pressure difference produced in the pressure adjusting process after the forming process; and an extracting process of extracting a formed product while releasing the pressure difference in the pressure releasing process, wherein a lower end portion of the upper box is provided with a jig which suppresses lifting of the decorative film, and wherein heating of the decorative film 5 is stopped in the pressure adjusting process.

2. The vacuum forming method according to claim 1, wherein, in the lower end portion of the upper box, the jig is provided to be positioned on the outside of the periphery of the adherend so as to be defined individually.

3. The vacuum forming, method according to claim 1, wherein the jig has a wire shape or a thin plate shape.

4. The vacuum forming method according to claim 1, wherein the surface of the adherend is subjected to a flame treatment.

5. The vacuum forming method according to claim 1, wherein, in the pressure adjusting process, the lower division of the forming space is allowed to be in a vacuum state, and the upper division of the forming space is allowed to be in a pressurized state, a state at atmospheric pressure, or a state at a pressure lower than the atmospheric pressure.

* * * * *